(12) United States Patent
Yen et al.

(10) Patent No.: US 8,558,674 B2
(45) Date of Patent: Oct. 15, 2013

(54) WIRELESS PRESENTATION SYSTEM AND PAIRING METHOD APPLIED THERETO

(75) Inventors: Christopher Yen, Taipei (TW); Jiun-Shin Wu, Taipei (TW); Tzung-Lin Lee, Taipei (TW); Chen-Hsiang Yu, Taipei (TW); Mei-Jen Kuo, Taipei (TW)

(73) Assignee: Aver Information Inc., New Taipei (TW)

( * ) Notice: Subject to any disclaimer, the term of this patent is extended or adjusted under 35 U.S.C. 154(b) by 1129 days.

(21) Appl. No.: 12/207,765

(22) Filed: Sep. 10, 2008

(65) Prior Publication Data

US 2009/0174530 A1  Jul. 9, 2009

(30) Foreign Application Priority Data

Jul. 1, 2008  (TW) ............................... 97124794 A

(51) Int. Cl.
*H04Q 5/22* (2006.01)
*G08B 13/14* (2006.01)

(52) U.S. Cl.
USPC ...................... 340/10.52; 340/10.1; 340/568.1

(58) Field of Classification Search
USPC ................ 340/10.52, 568.1, 10.1, 10.2, 10.3, 340/10.4; 370/461, 312; 455/411, 410, 88; 398/140; 710/19, 101; 345/156
See application file for complete search history.

(56) References Cited

U.S. PATENT DOCUMENTS

| | | | | |
|---|---|---|---|---|
| 6,028,866 A | * | 2/2000 | Engel et al. | 370/461 |
| 6,195,712 B1 | * | 2/2001 | Pawlowski et al. | 710/19 |
| 7,054,616 B2 | * | 5/2006 | Rickhoff et al. | 455/411 |
| 7,436,300 B2 | * | 10/2008 | Glass et al. | 340/568.1 |
| 2004/0071471 A1 | * | 4/2004 | Baker et al. | 398/140 |
| 2006/0105712 A1 | | 5/2006 | Glass | |

FOREIGN PATENT DOCUMENTS

TW  200746663  12/2007

* cited by examiner

*Primary Examiner* — Nam V Nguyen
(74) *Attorney, Agent, or Firm* — Kirton McConkie; Evan R. Witt

(57) ABSTRACT

A wireless presentation system includes a first wireless input element, a second wireless input element and a wireless receiving and processing host. A pairing method for use in the wireless presentation system includes the following steps. The wireless receiving and processing host generates a first identification code, and if the first wireless input element is present, issues the first identification code to the first wireless input element for storage, so that a pairing relation therebetween is established by the first identification code. The wireless receiving and processing host automatically generates a second identification code after the first identification code is issued, and if the second wireless input element is present, issues the second identification code to the second wireless input element for storage, so that the pairing relation therebetween is established by the second identification code.

7 Claims, 3 Drawing Sheets

WIRELESS PRESENTATION SYSTEM AND PAIRING METHOD APPLIED THERETO

FIELD OF THE INVENTION

The present invention relates to a wireless presentation system and a pairing method applied thereto, and more particularly to a wireless presentation system for use with a personal computer and a pairing method applied thereto.

BACKGROUND OF THE INVENTION

Human-machine interface input devices are essential components of various electronic information products such as personal computers. In the early stage, the customarily used human-machine interface input devices include for example keyboards, trackballs, mice, touch pads, and so on. For helping the user well operate the computer system, the human-machine interface input devices are continuously developed in views of intuitive, easy-to-use and swift operations. Recently, a presenter is an exemplary human-machine interface input device complying with these requirements.

FIG. 1 is a schematic functional block illustrating collective operations of a conventional presenter and a personal computer. According to a command inputted into the presenter 10 by a user, the presenter 10 issues a wireless control signal to a wireless transceiver 12, which is connected to a connecting port 110 of the personal computer 11. According to the wireless control signal, the personal computer 11 is controlled to generate a display frame 14 through a projector 13.

Conventionally, a one-to-one pairing relation is existed between the presenter 10 and the wireless transceiver 12. That is, before shipment of the presenter 10 and the wireless transceiver 12, the pairing relation has been established. Under this circumstance, the presenter 10 and the wireless transceiver 12 fail to pair with other wireless transceivers and other presenters and thus the flexibility of using the presenter is deficient.

Therefore, there is a need of providing a wireless presentation system and a pairing method to obviate the drawbacks encountered from the prior art.

SUMMARY OF THE INVENTION

The present invention provides a wireless presentation system. The wireless presentation system includes a first wireless input element, a second wireless input element and a wireless receiving and processing host. The first wireless input element includes a first identification code storage unit. The second wireless input element includes a second identification code storage unit. The wireless receiving and processing host is communicated with the first wireless input element and the second wireless input element. The wireless receiving and processing host generates a first identification code, and if the first wireless input element is present, issues the first identification code to the first identification code storage unit of the first wireless input element for storage, so that the pairing relation between the first wireless input element and the wireless receiving and processing host is established by the first identification code to control presentation. The wireless receiving and processing host automatically generates a second identification code after the first identification code is issued, and if the second wireless input element is present, issues the second identification code to the second identification code storage unit of the second wireless input element for storage, so that the pairing relation between the second wireless input element and the wireless receiving and processing host is established by the second identification code to control presentation.

In an embodiment, the first identification code storage unit and the second identification code storage unit are flash memories.

In an embodiment, the wireless receiving and processing host includes a personal computer, a display device and a wireless receiver. The display device is electrically connected to the personal computer for showing a presentation frame generated by the personal computer. The wireless receiver is communicated with the personal computer through a connecting port. The wireless receiver generates the first and second identification codes, issues the first and second identification codes to the first and second identification code storage units of the first and second wireless input elements for storage if the first and second wireless input elements are respectively present, receives first and second wireless signals respectively issued by the first and second wireless input elements, and transmits the first and second wireless signals to the personal computer to control presentation.

In an embodiment, the wireless receiving and processing host discriminates that a specified wireless input element is present if a distance between the specified wireless input element and the wireless receiver is smaller than a threshold value.

In an embodiment, each of the identification codes issued by the wireless receiver includes a component identity code and a serial number. The component identity code denotes an identity of the wireless receiver. The serial number is generated if a corresponding wireless input element is present.

The present invention also provides a pairing method for use between a wireless receiving and processing host, a first wireless input element and a second wireless input element. The pairing method includes the following steps. The wireless receiving and processing host generates a first identification code, and if the first wireless input element is present, issues the first identification code to the first wireless input element for storage, so that the pairing relation between the first wireless input element and the wireless receiving and processing host is established by the first identification code. The wireless receiving and processing host automatically generates a second identification code after the first identification code is issued, and if the second wireless input element is present, issues the second identification code to the second wireless input element for storage, so that the pairing relation between the second wireless input element and the wireless receiving and processing host is established by the second identification code.

In an embodiment, the wireless receiving and processing host discriminates that a specified wireless input element is present if a distance between the specified wireless input element and the wireless receiver is smaller than a threshold value.

In an embodiment, each of the identification codes is computed by a component identity code and a serial number. The component identity code denotes an identity of the wireless receiver. The serial number is generated if a corresponding wireless input element is present.

In an embodiment, when a specified wireless input element is approaching the wireless receiver, a user interface defined by the application program is shown such that a tag corresponding to the identification code of the specified wireless input element is inputted via the user interface; or the user actively executes a pairing application program to pair with any wireless input element.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
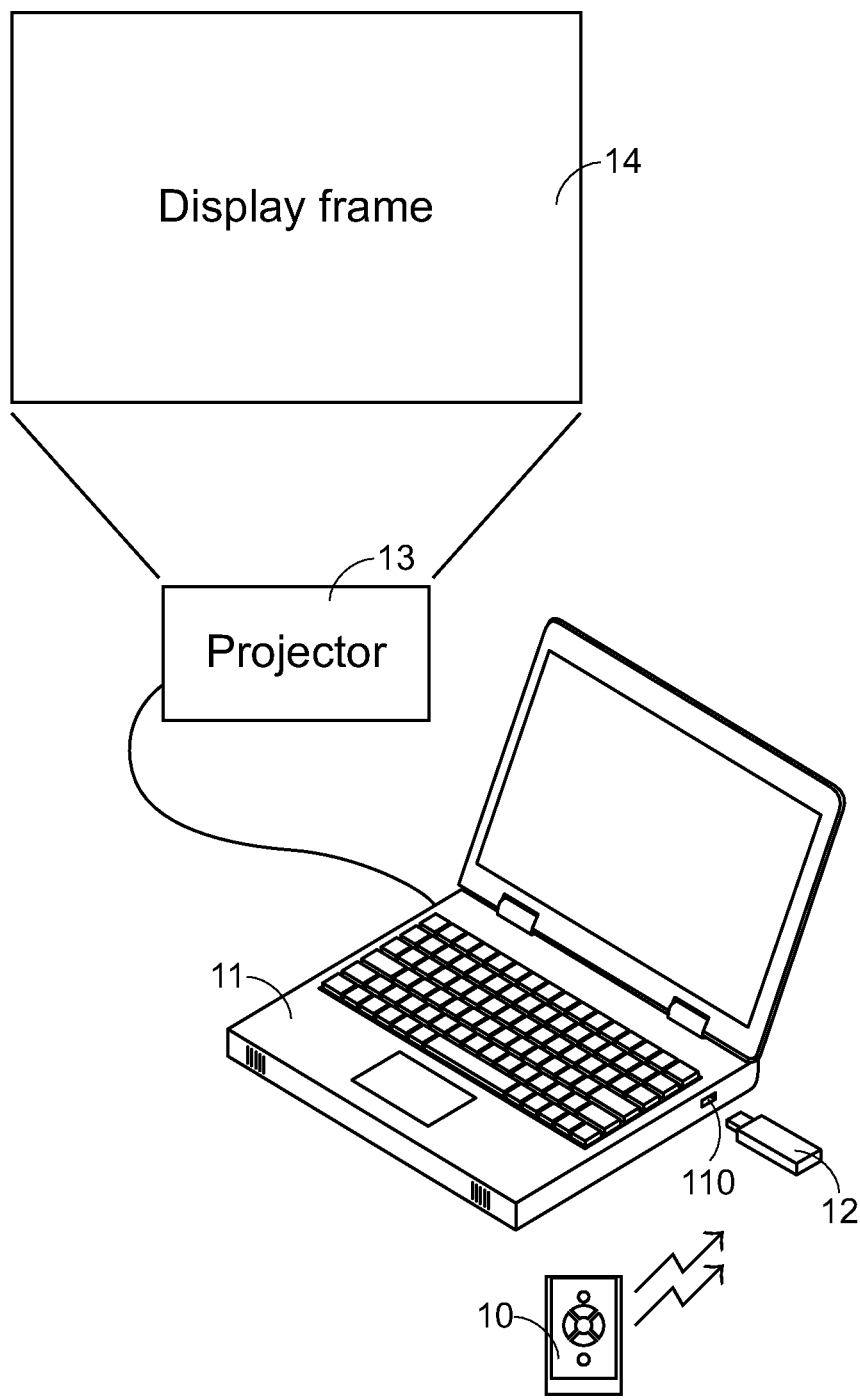
FIG. 1 is a schematic functional block illustrating collective operations of a conventional presenter and a personal computer.
Figure 2:
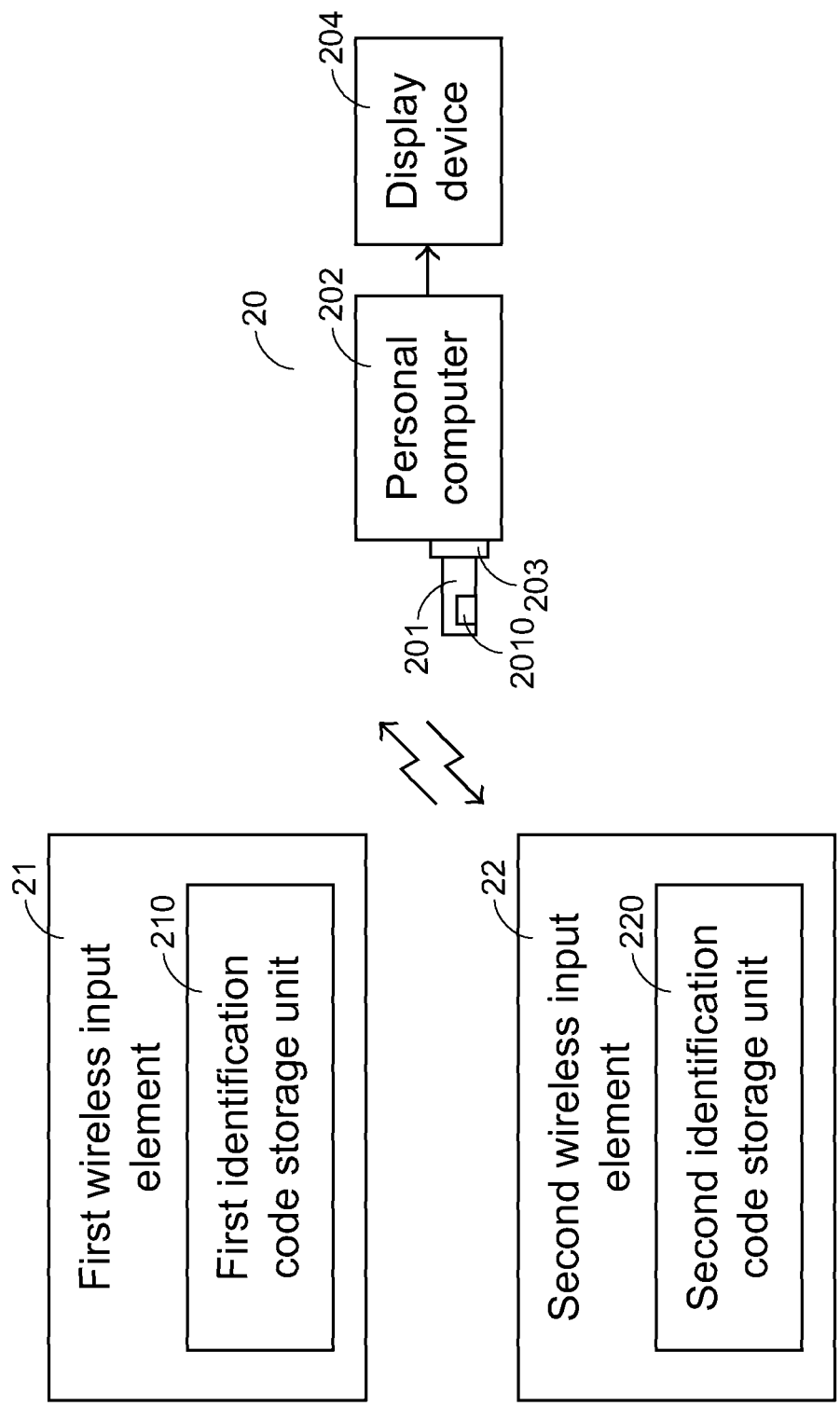
FIG. 2 is a schematic functional block diagram of a presentation system according to a preferred embodiment of the present invention.

For obviating the drawbacks encountered from the prior art, a schematic functional block diagram of a presentation system according to a preferred embodiment of the present invention is illustrated in FIG. 2. The presentation system of FIG. 2 principally comprises multiple wireless input elements and a wireless receiving and processing host 20. For clarification, two wireless input elements 21 and 22 are shown in the drawings. The first wireless input element 21 includes a first identification code storage unit 210. The second wireless input element 22 includes a second identification code storage unit 220. In accordance with a key feature of the present invention, the first identification code storage unit 210 and the second identification code storage unit 220 are rewritable. That is, the pairing relation between the wireless input element 21 (or 22) and the wireless receiving and processing host 20 has not yet been established before the wireless input element is available in the market. For enhancing the using flexibility, the process of establishing the pairing relation is manipulated by the user. The wireless receiving and processing host 20 comprises a wireless receiver 201, a personal computer 202 and a display device 204. The wireless receiver 201 is communicated with the personal computer 202 through a connecting port 203 (e.g. USB connecting port). The wireless signals issued by the wireless input elements 21 and 22 are received by the wireless receiver 201 and then transmitted to the personal computer 202 so as to control presentation. In addition, a presentation frame is shown on the display device 204 by means of the personal computer 202. Examples of the wireless input elements 21 and 22 are wireless presenters matching the wireless receiver 201. The wireless input elements 21 and 22 are communicated with the wireless receiving and processing host 20 in a wireless transmission manner. After the wireless input elements 21 and 22 and the wireless receiving and processing host 20 are powered on, a pairing method is performed to pair the wireless input elements 21 and 22 with the wireless receiving and processing host 20.

Figure 3:
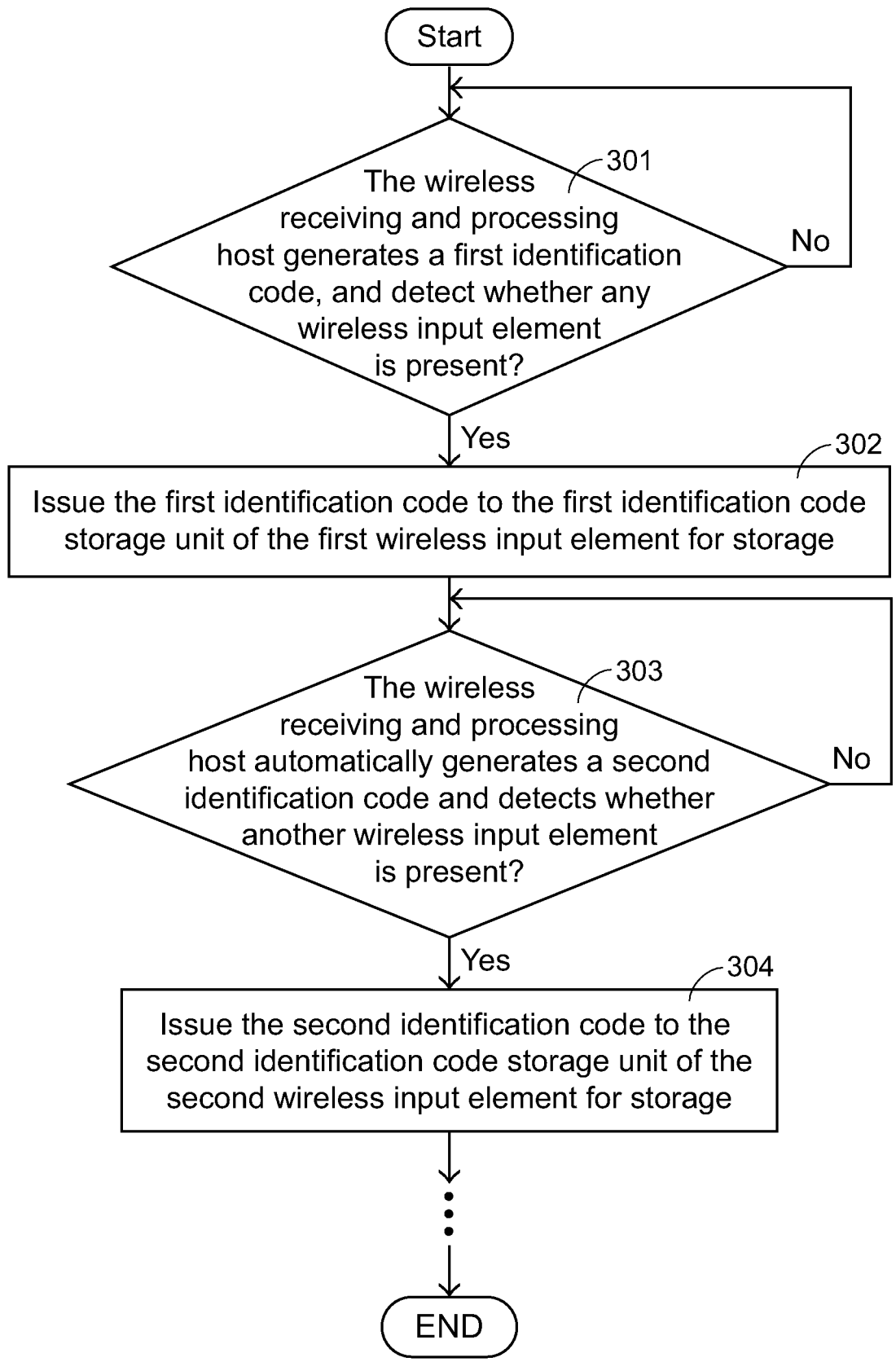
FIG. 3 schematically illustrates a flowchart of a pairing method of the present invention.

Hereinafter, a flowchart of a pairing method will be illustrated with reference to FIG. 3. First of all, the wireless receiving and processing host 20 generates a first identification code and detects whether a wireless input element is present (Step 301). If the first wireless input element 21 is present, the first identification code is issued to and stored in the first identification code storage unit 210 of the first wireless input element 21 (Step 302). By the first identification code stored in the first identification code storage unit 210 of the first wireless input element 21, a pairing relation between the first wireless input element 21 and the wireless receiving and processing host 20 is established to control presentation. In addition, after the first identification code is issued, the wireless receiving and processing host 20 automatically generates a second identification code and detects whether another wireless input element is present (Step 303). If the second wireless input element 22 is present, the second identification code is issued to and stored in the second identification code storage unit 220 of the second wireless input element 22 (Step 304). By the second identification code stored in the second identification code storage unit 220 of the second wireless input element 22, a pairing relation between the second wireless input element 22 and the wireless receiving and processing host 20 is established to control presentation. In a case that more than two wireless input elements are present, the above procedures are repeated to establish the relations between respective wireless input elements and the wireless receiving and processing host 20 until the maximum allowable wireless input elements to be supported by the wireless receiving and processing host 20 have been paired.

The wireless receiving and processing host 20 may discriminate whether any wireless input element is present and establish the pairing relation by using some approaches. According to a first approach, the wireless receiving and processing host 20 and the wireless input element have respective buttons. The user may successively press down the buttons in a predetermined schedule to establish the pairing relation. According to a second approach, the wireless receiving and processing hosts located within the sensing range of a specified wireless input element are listed. A desired one of these wireless receiving and processing hosts is selected by the user to pair with the specified wireless input element. The second approach needs a user interface and thus increases extra cost. In addition, the designations or other identification features of the wireless receiving and processing hosts should be included in the checklist in order to be selected. The third approach adopts a Cypress KISSBind technology to exchange information. In other words, the pairing relation between the wireless receiving and processing host and the wireless input element is easily established when they are close to each other. In such manner, the wireless receiving and processing host discriminates that a specified wireless input element is present if a distance between the specified wireless input element and the wireless receiver is smaller than a threshold value. Afterwards, the pairing method of the present invention is implemented.

Each identification code generated by the wireless receiver 201 includes a component identity code and a serial number. The component identity code is built in the wireless receiver 201 by the manufacturer to denote the unique identity of the wireless receiver 201. In addition, a serial number is automatically generated whenever a new wireless input element is detected by the wireless receiver 201 (for example no identification code is stored in the identification code storage unit thereof or the identification code stored in the identification code storage unit is different from those identification codes stored in the wireless receiver 201). The component identity code and the serial number are combined as an identification code, which is then transmitted to the identification code storage unit of the wireless input device for storage. The correlation between the serial number, the component identity code, the identification code and a tag will be illustrated with reference to the following look-up table.

| Serial number | Component identity code | Identification code | Tag |
|---|---|---|---|
| 01 | AABBCCDD | AABBCCDD01 | Group 1 No. 1 |
| 02 | AABBCCDD | AABBCCDD02 | Group 1 No. 2 |
| 03 | AABBCCDD | AABBCCDD03 | Group 2 No. 1 |
| ... | ... | ... | ... |

Alternatively, the identification code may be obtained by another computation. For example, a multiplication operation is performed on the serial number and the component identity code, thereby obtaining unrepeatable identification codes.

The look-up table may be stored in a memory unit 2010 of the wireless receiver 201. For facilitating management, the contents of the tag are inputted through a user interface defined by execution of an application program of the personal computer 202. For example, when a wireless input element held by the user is approaching the wireless receiver 201, a corresponding user interface defined by the application program is shown such that the user may input the contents of the tag. The contents of the tag include for example the group number in a class, the order number in the group or the name of the user. Alternatively, the user may actively execute a pairing application program to pair with any wireless input element, so that the personal computer 202 is capable of effectively managing the input operation of each wireless input element.

From the above description, the wireless presentation system and the pairing method of the present invention are capable of obviating the drawbacks encountered from the prior art. Since the process of establishing the pairing relation between the wireless input element and the wireless receiver is open to the user, the using flexibility of the present invention is enhanced.

Moreover, the wireless presentation system and the pairing method of the present invention may be used with an electronic whiteboard. When making a presentation, holding a meeting or giving a lecture, the attendants may keep their notes and annotations on the electronic whiteboard in order to achieve an opinion feedback purpose. The technology of the electronic whiteboard is disclosed in for example U.S. patent application Ser. No. 12/207,675, and the contents of which are hereby incorporated by reference. The wireless input element of the present invention can be used in the cursor control device to control the pointer shown on the electronic whiteboard so as to handwrite, discuss, vote or answer question on the electronic whiteboard. For handwriting purpose, the wireless input element of the present invention may have a pen-like body. Moreover, the wireless input element and the wireless receiver of the present invention may be integrated into any presentation system having an opinion feedback function.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless presentation system comprising:
a first wireless input element including a first identification code storage unit;
a second wireless input element including a second identification code storage unit; and
a wireless receiving and processing host communicated with the first wireless input element and the second wireless input element, wherein the wireless receiving and processing host generates a first identification code, and if the first wireless input element is present, issues the first identification code to the first identification code storage unit of the first wireless input element for storage, so that the pairing relation between the first wireless input element and the wireless receiving and processing host is established by the first identification code to control presentation; and the wireless receiving and processing host automatically generates a second identification code after the first identification code is issued, and if the second wireless input element is present, issues the second identification code to the second identification code storage unit of the second wireless input element for storage, so that the pairing relation between the second wireless input element and the wireless receiving and processing host is established by the second identification code to control presentation;
wherein each of the first and second identification codes issued by a wireless receiver of the wireless receiving and processing host comprises a component identity code denoting an identity of the wireless receiver; and a serial number generated if the first or second wireless input element is present.

2. The wireless presentation system according to claim 1 wherein the first identification code storage unit and the second identification code storage unit are flash memories.

3. The wireless presentation system according to claim 1 wherein the wireless receiving and processing host comprises:
a personal computer;
a display device electrically connected to the personal computer for showing a presentation frame generated by the personal computer; and
a wireless receiver communicated with the personal computer through a connecting port for generating the first and second identification codes, issuing the first and second identification codes to the first and second identification code storage units of the first and second wireless input elements for storage if the first and second wireless input elements are respectively present, receiving first and second wireless signals respectively issued by the first and second wireless input elements, and transmitting the first and second wireless signals to the personal computer to control presentation.

4. The wireless presentation system according to claim 3 wherein the wireless receiving and processing host discriminates that a specified wireless input element is present if a distance between the specified wireless input element and the wireless receiver is smaller than a threshold value.

5. A pairing method for use between a wireless receiving and processing host, a first wireless input element and a second wireless input element, the pairing method comprising steps:
the wireless receiving and processing host generating a first identification code, and if the first wireless input element is present, issuing the first identification code to the first wireless input element for storage, so that the pairing relation between the first wireless input element and the wireless receiving and processing host is established by the first identification code; and
the wireless receiving and processing host automatically generating a second identification code after the first identification code is issued, and if the second wireless input element is present, issuing the second identification code to the second wireless input element for storage, so that the pairing relation between the second wireless input element and the wireless receiving and processing host is established by the second identification code;

wherein each of the first and second identification codes is computed by a component identity code denoting an identity of a wireless receiver of the wireless receiving and processing host; and a serial number generated if the first or second wireless input element is present.

6. The pairing method according to claim 5 wherein the wireless receiving and processing host discriminates that a specified wireless input element is present if a distance between the specified wireless input element and the wireless receiver is smaller than a threshold value.

7. The pairing method according to claim 5 wherein when any one of the first wireless input element and the second wireless input element is approaching the wireless receiving and processing host, a user interface defined by an application program stored in the wireless receiving and processing host is shown, so that a user may input the contents of a tag corresponding to the identification code of the wireless input element approaching the wireless receiving and processing host via the user interface; or the user actively executes a pairing application program to pair with any wireless input element.

* * * * *